United States Patent [19]

Shedigian et al.

[11] 4,381,535
[45] Apr. 26, 1983

[54] DIELECTRIC FLUID

[75] Inventors: Vandos Shedigian; Gerald A. Voyles, both of Indianapolis, Ind.

[73] Assignee: Emhart Industries, Inc., Indianapolis, Ind.

[21] Appl. No.: 241,002

[22] Filed: Mar. 5, 1981

[51] Int. Cl.³ .............................................. H01G 4/22
[52] U.S. Cl. .................................. 361/318; 174/25 C;
   252/567; 252/581; 361/315; 361/319; 361/327
[58] Field of Search ............... 361/315, 318, 319, 327;
   252/567, 572, 576, 578, 580, 581; 174/25 C

[56] References Cited

U.S. PATENT DOCUMENTS

| | | | |
|---|---|---|---|
| 2,041,594 | 5/1936 | Clark | 252/581 X |
| 3,363,156 | 1/1968 | Cox | 361/318 |
| 3,450,968 | 6/1969 | Cox | 252/567 X |
| 3,833,978 | 9/1974 | Eustance | 361/315 X |
| 4,142,223 | 2/1979 | Shaw | 361/315 |

FOREIGN PATENT DOCUMENTS 1528793 10/1978 United Kingdom .

OTHER PUBLICATIONS

"A New Synthetic Impregnant For High Tension Hollow Core Cables" by U. Pelagotti, 1963 *Annual Report of the Conference on Electrical Insulation and Dielectric Phenomena,* Publ. #1141.

*Primary Examiner*—R. R. Kucia
*Attorney, Agent, or Firm*—Robert F. Meyer; David W. Gomes

[57] ABSTRACT

A dielectric fluid for a capacitor includes a mixture of phthalate ester, polychlorinated benzene and a linear alkylbenzene.

4 Claims, 3 Drawing Figures

DIELECTRIC FLUID

BACKGROUND OF THE INVENTION

1. Field of the Invention

The present invention generally relates to dielectric fluids used in capacitors and, in particular, two such fluids which include dioctyl phthalate.

2. Statement of the Prior Art

In the manufacturing of high voltage capacitors, such as those used in appliances like microwave ovens, the selection of the dielectric fluid has a substantial influence on the electrical characteristics of the capacitor. Voltages, in such applications, are commonly within the range of 1000 to 2500 volts. Therefore, it is necessary that the dielectric fluid have a relatively high corona start voltage and a relatively high corona extinguish voltage. The dielectric fluid should further have as high a dielectric constant as practical in order to provide volumetric efficiency to the capacitor. Physically, the fluid must have a relatively low viscosity to enable it to permeate the capacitor winding and fill the voids between the electrodes and the dielectric material. The fluid should also be refinable to achieve low losses in the dielectric during operation. For many years, polychlorinated biphenyls, hereinafter PCBs, have been used as at least part of dielectric fluids because of their ability to satisfy the above requirements. However, PCBs have recently been associated with ecological problems, restrictive use limitations and rising costs. Therefore, suitable substitutes are necessary if these problems are to be avoided. Difficulty is encountered, however, in finding fluids which have comparable performance characteristics to meet the above requirements.

One material which has met with some success in meeting these requirements is a phthalate ester called dioctylphthalate, or more specifically, 2-ethyl-hexyl phthalate (hereinafter DOP). As per the present invention, it has been found that the performance characteristics of capacitors made with DOP as the dielectric fluid can be improved in high voltage applications.

SUMMARY OF THE INVENTION

Accordingly, the present invention provides a dielectric fluid for a capacitor including a mixture of a phthalate ester, a polychlorinated benzene and a linear alkylbenzene.

BRIEF DESCRIPTION OF THE DRAWINGS

The present invention is illustratively described in respect to the appended drawings in which.

DETAILED DESCRIPTION OF THE DRAWINGS

Figure 1:
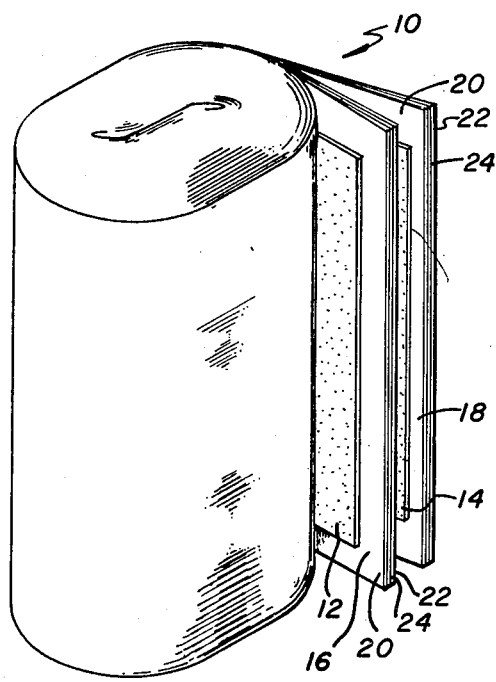
FIG. 1 is a perspective view of the electrode-dielectric body of a convolutely wound capacitor constructed according to an embodiment of the present invention.

FIG. 1 shows the convolutely wound electrodes of a high voltage dielectric capacitor constructed according to one embodiment of the present invention. The capacitor body 10 includes a pair of electrodes 12 and 14 which are separated by a pair of dielectric separators 16 and 18. The electrodes 12 and 14 may be made of any suitable electrically conductive metal such as aluminum. The dielectric means, or separators 16 and 18, used in high voltage capacitors and for the present invention each includes a pair of sheets of plastic film 20 and 22 which are separated by a sheet of paper 24. The plastic film is typically a polymeric film which may be selected from the group consisting of polypropylene, polyethylene, polyester, polycarbonate, polystyrene, polysulfone and polyethylene terephthalate. Other suitable arrangements may also be used in place of that of the present invention. Such arrangements might include the same materials but different combinations of dielectric sheets. Examples are a combination of single sheets of paper and plastic film or the combination of two sheets of paper and a single sheet of plastic film.

Figure 2:
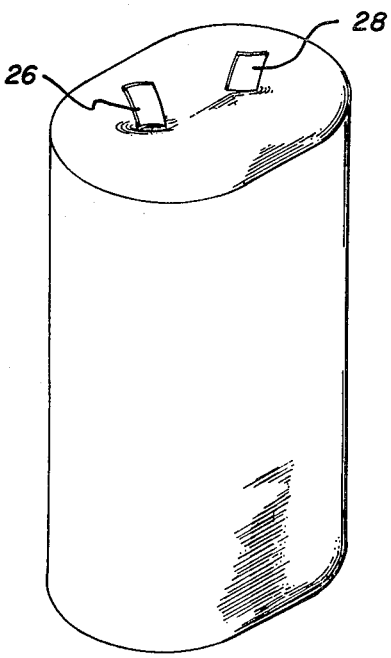
FIG. 2 is a perspective view of the embodiment of FIG. 1 wherein the coils are completely wound and electrical leads are attached to the electrodes.

FIG. 2 shows the electrode body 10 of FIG. 1 with the electrodes completely wound and with a pair of electrical leads 26 and 28, each of which is connected to a separate electrode such as 12 and 14, respectively. The leads 26 and 28 may be made of any suitable material such as solder coated copper.

Figure 3:
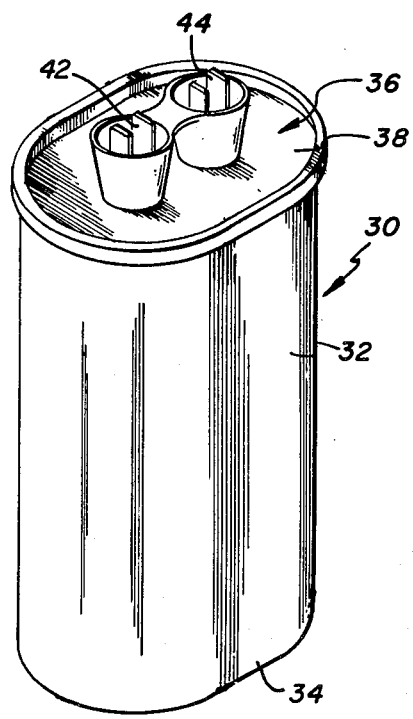
FIG. 3 is a perspective view of the embodiments of FIGS. 1 and 2 after being packaged in a suitable capacitor casing.

FIG. 3 show a completed capacitor 30 having a housing or can 32 enclosing the electrode body 10. The housing 32 has a closed end 34 and an open end 36 through which the capacitor body 10 is inserted during manufacturing. A cover 38 enclosed the end 36 and includes a pair of electrical terminals 42 and 44 which are connected to the leads 26 and 28 respectively, from the electrodes 12 and 14. Any suitable material may be used for the housing 32 and cover 36, such as aluminum, with proper precautions being taken to prevent shorting of either the electrodes 12, 14, leads 26, 28 or terminals 42, 44 thereto.

In the manufacturing of the capacitor 10, electrodes 12 and 14, with electrical leads 26 and 28, are first assembled with the dielectric means or separators 16 and 28 in a stacked fashion. The stack is then rolled to form the capacitor body shown in FIG. 2, and the body is inserted into a housing 34. At this point, the electrical leads 26 and 28 are connected to the terminals 42 and 44 on the cover 38. The cover 38 is then attached to the housing 32 and sealed by any suitable means such as welding. The cover 38 also includes an opening or hole (not shown) to allow the ingress and egress of gasses and liquids. The housing 34 is then placed in a vacuum oven and heat dried for an extended period of time which in most cases would probably be a minimum of at least eight hours. This is needed to drive contaminants such as water from the capacitor body. At this point in the manufacturing process, a dielectric fluid is added under vacuum.

The dielectric fluid which is added and which concerns the present invention is a mixture of a phthalate ester, a polychlorinated benzene and a linear alkylbenzene. An obvious choice for the phthalate ester is 2-ethyl-hexyl phthalate or dioctylphthalate which has been gaining in popularity as a dielectric fluid.

The preferred form of the polychlorinated benzene is trichlorobenzene (TCB), or more specifically 1,2,4-trichlorobenzene. The use of trichlorobenzene in dielectric fluids is described in a United Kingdom Patent Specification No. 1,528,793. What has been further determined is that by substantially restricting the trichlorobenzene to the isomer 1,2,4-trichlorobenzene, it is possible to reduce the amount of TCB in terms of percentage by volume of the entire mixture to substantially below 20%, while still maintaining an acceptable dielectric constant for the fluid. The dielectric constant of the fluid disclosed in the U.K. Spec. above showed a substantial decrease for amounts of TCB below 20% by volume. The reason for this was the inclusion of substantial amounts of 1,2,3-trichlorobenzene in addition to a smaller proportion of 1,2,4-trichlorobenzene. Thus, by substantially restricting the mixture to 1,2,4-trichlorobenzene, smaller amounts can be used and greater latitude is allowed for the inclusion of other additives. The optimum figure for percent by volume inclusion of TCB for the present invention has been found to be approximately 10%.

The preferred form for the linear alkylbenzene constituent of the present invention is a compound including a benzene ring and ten (10) to fourteen (14) carbon atoms. In the preferred form, the carbon atoms are twelve (12) in number and form an aliphatic chain This form is called dodecylbenzene or DDB. Dodecylbenzene has long been produced as a detergent alkylate and is available under the trademark NALKYLENE 500 which is owned by the Continental Oil Company of Houston, Tex. Its qualities as a gas absorber have been known since 1963 as evidenced by a report entitled "A New Synthetic Impregnant For High Tension Hollow Core Cables" which appeared in the 1963 Annular Report Of The Conference on Electrical Insulation and Dielectric Phenomena. It is useful as an additive for the dielectric fluid of the present invention because it has a low contact angle with the plastic film used for the dielectric means or separators 16 and 18 and thus readily permeates the film and the rolled capacitor body. DDB is also important because it produces beneficial swelling of the plastic film. During the rolling of the capacitor body, it is impossible to completely eliminate spaces between the film and the electrodes 12 and 14. These spaces or tiny pockets can also be formed during the heat drying process by the escape of moisture and gasses. DDB produces a swelling of the film which causes the film to expand into and fill the various spaces and pockets formed. By thus reducing the thickness of the dielectric fluid the amount of dielectric stress under which the fluid performs is reduced to prolong the life of the fluid and therefore the life of the capacitor. Further, the swelling restricts the movement of impurities within the fluid layer and prevents the gathering of impurities in areas of high stress and the build up of impurity ridges.

A further advantage of using DDB is its substantial gas absorption qualities and the resultant reduction of capacitor failure.

DDB is included in the dielectric fluid in an amount varying between 0.1% and 30% by volume. The preferred amount is 20% by volume.

Thus, the constituents of the dielectric fluid are blended in the preferred amounts of approximately 70% DOP, 10% TCB and 20% DDB by volume along with other possible additives such as epoxide stabilizers. The blend is refined through a chromatographic column using Fuller's earth or aluminum oxide and placed in a vacuum oven for drying. The fluid is then introduced under heat and vacuum into the capacitor body through the hole in cover 38. Repetitive pressurizations of the assemblage to atmospheric pressure and reestablishment of the vacuum can be used to force the dielectric fluid into the capacitor body and its plastic dielectric film. The hole is then sealed to complete the manufacturing process.

Table 1 displays the operating characteristics of capacitors constructed using various dielectric fluids including that of the present invention. The types of dielectric fluid are identified across the top and the characteristics measured are listed in the left hand column.

| Fluid | Aroclor 1242 | DOP | DDB | TCB | DOP + DDB 80-20 | DOP + DDB TCB 70-20-10 |
|---|---|---|---|---|---|---|
| Dielectric Constant (25°) | 6.0 | 5.0 | 2.2 | 3.9 | 4.5 | 4.4 |
| Viscosity-CS (25° C.) | 44 | 62 | 6.5 | 1.38 | 33.8 | 19 |
| Specific Gravity (25° C.) | 1.36 | 0.983 | 0.860 | 1.454 | 0.959 | 1.01 |
| Capacity After Impregnation μF | 0.90 | 0.87 | 0.78 | — | 0.86 | 0.85 |
| CSV-(140V/Min.; 50pc/cm) | 3000 | 700 | 3150 | — | 2650 | 3000 |

As shown by the data of table 1, the performance characteristics associated with the 70-20-10 mixture of DOP, DDB and TCB are comparable to those associated with the PCB dielectric fluid Arclor 1242, and in many cases, superior to the other mixtures shown.

The above description of the present invention is intended to be taken in an illustrative and not a limiting sense, and various modifications and changes may be made to the described embodiments by persons skilled in the art without departing from the scope of the appended claims.

What is claimed is:

1. In a capacitor, a dielectric fluid consisting of a phthalate ester, dodecylbenzene in a percent by volume amount of substantially 20% and 1,2,4-trichlorobenzene in a percent by volume amount of substantially 10%.

2. A capacitor comprising a pair of electrically conductive electrodes and a dielectric means separating said electrodes, said dielectric means including a plastic film and the dielectric fluid of claim 1.

3. The capacitor of claim 1, wherein said plastic film is selected from the group consisting of polypropylene, polyethylene, polyester, polycarbonate, polystyrene, polysulfone and polyethylene terephthalate.

4. The capacitor of claim 3, wherein said electrodes are convolutely wound and said dielectric means includes two dielectric separators for separating said pair of electrodes when wound, each said separator including a pair of sheets of said plastic film separated by a sheet of paper.

* * * * *